United States Patent [19]

VanMaaren

[11] Patent Number: 4,786,853
[45] Date of Patent: Nov. 22, 1988

[54] BRUSHLESS CAPACITOR EXCITED GENERATOR

[75] Inventor: Richard D. VanMaaren, Sheboygen, Wis.

[73] Assignee: Kohler Co., Kohler, Wis.

[21] Appl. No.: 28,799

[22] Filed: Mar. 23, 1987

[51] Int. Cl.⁴ ............................................. H02P 9/10
[52] U.S. Cl. ...................................... 322/75; 322/47; 322/95
[58] Field of Search ................................ 322/63–65, 322/47, 75, 95

[56] References Cited

U.S. PATENT DOCUMENTS

| | | | |
|---|---|---|---|
| 1,104,257 | 7/1914 | Goldschmidt. | |
| 2,349,308 | 5/1944 | Rhyne | 171/223 |
| 2,509,662 | 5/1950 | Wisman | 322/46 |
| 2,867,738 | 1/1959 | Schwan | 322/47 X |
| 3,043,115 | 7/1962 | Harter | 62/236 |
| 3,121,838 | 2/1964 | Mozic | 322/32 |
| 3,366,869 | 1/1968 | Young | 322/46 |
| 3,676,764 | 7/1972 | Syverson | 322/51 |
| 3,697,859 | 10/1972 | Nordbrock | 322/28 |
| 3,771,046 | 11/1973 | Harter | 322/65 |
| 3,982,169 | 9/1976 | Cummins | 320/64 |
| 4,246,532 | 1/1981 | Kubo | 322/89 |
| 4,296,368 | 10/1981 | Kubo | 322/75 |

*Primary Examiner*—R. J. Hickey
*Attorney, Agent, or Firm*—Quarles & Brady

[57] ABSTRACT

A brushless capacitor excited alternator includes a rotor assembly having a coil and a diode connected in series with the coil. A stator contains the output coil of the alternator. Also wound on the stator are primary and auxiliary excitation coils. An excitation capacitor is provided with means for connecting it between various terminals on the primary and auxiliary excitation coils, and for connecting the two coils together. The magnetic field and thus the output voltage of the alternator may be varied by connecting the capacitor to different coil terminals.

7 Claims, 1 Drawing Sheet

| VOLTAGE ADJUSTMENT | CONNECT C2 TO | CONNECT E2 TO |
|---|---|---|
| -6 | A3 | A1 |
| -4 | A3 | A2 |
| -2 | A2 | A1 |
| 0 | E2 | C2 |
| +2 | A1 | A2 |
| +4 | A2 | A3 |
| +6 | A1 | A3 |

BRUSHLESS CAPACITOR EXCITED GENERATOR

The present invention relates to brushless electrical generators, and specifically to such devices which use a capacitor to produce field excitation.

Conventional brushless alternators, such as shown in U.S. Pat. No. 3,676,764, utilize a portion of the generated output current to produce a magnetic field in the alternator. This current is rectified and fed through an excitation coil on the alternator stator. Typically, such coupling includes a potentiometer for varying the voltage across the excitation coil to adjust the field of the alternator and, thereby, the output voltage. If the excitation voltage fluctuates a voltage regulator may be added in the excitation circuit.

U.S. Pat. No. 4,296,368 entitled "Internal Combustion Engine Driven Generator" shows a different type of brushless alternator which does not use a portion of the output current to produce its magnetic field. Instead, the excitation coil on the stator merely has a capacitor connected across it. The rotor has a field coil with a diode connected across it.

When this latter type of alternator is started, residual magnetism in the rotor core produces a magnetic flux which induces a small alternating current in the excitation coil. The capacitor connected to this coil phase shifts the induced current to produce a magnetic flux that is opposed to the flux from the rotor. The flux from the excitation circuit in turn induces a current in the rotor coil which is rectified by the diode to strengthen the magnetic field on the rotor. At the same time, current induced in the output coil coupled to the generator load increases the rotating electromotive force in the air gap between the rotor and stator. The alternator thereby bootstraps its operation until the magnetic field reaches a quiescent level.

The tolerance of the generator components affect its output voltage. Which in many applications must be held very close to the nominal value. With capacitor excited alternators variation in the capacitor value, size of the coil core laminations, stretch of the coil wire and air gap concentricity all affect the voltage of the generated electricity. However, it is impractical to use a potentiometer to adjust the voltage across the excitation coil in order to compensate for the effects of these variations. The potentiometer consumes too much of the power in the in the excitation circuit. Previously, the solution was to design the alternator to generate a greater voltage than was necessary and provide a regulator to reduce the output voltage. This technique requires additional, relatively expensive components.

SUMMARY OF THE INVENTION

The present invention provides a brushless generator having a coil wound on the rotor and a diode connected in series with the rotor coil. A main stator winding is provided for producing the output current of the generator. An excitation coil is wound on the stator for inducing a current in the rotor coil. The excitation coil includes a plurality of taps at various points on its winding. An excitation capacitor is provided with a means for selectively connecting it between different taps on the excitation coil. By connecting the capacitor to different taps the magnitude of the magnetic field produced by the excitation coil may be adjusted to produce an output voltage from the generator that is within the design tolerance.

An object of the present invention is to provide a mechanism for adjusting the output voltage of a brushless capacitor excited gnerator. A further object is to accomplish such voltage adjustment by varying the excitation field without the use of additional excitation power consuming devices. The present invention also provides an adjustment which may be easily implemented during testing of the generator. A further object is to incorporate a mechanism which compensates the effects of component tolerances on the output voltage of a generator so as to adjust the output voltage to the nominal level.

DETAILED DESCRIPTION OF THE PREFERRED EMBODIMENT

Figures 1, 2:
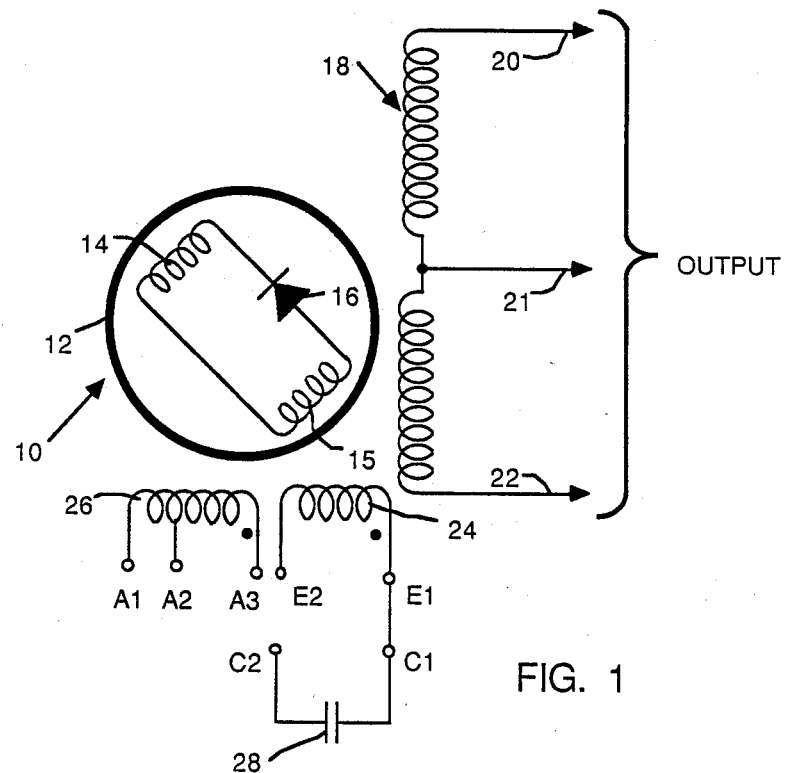
FIG. 1 of the drawing is a schematic representation on an alternator according to the present invention.
FIG. 2 in a table showing typical voltage adjustments provided by various capacitor connections.

As shown in FIG. 1, an electrical generator, such as a single phase alternator 10, has a rotor 12 which is driven by a prime mover such as a diesel engine. The illustrated alternator is a two pole device and therefore, the rotor has two field coils 14 and 15 wound around it. Alternatively, a four pole alternator could be constructed in which case the rotor would have four field coils. A diode 16 is connected between one pair of ends of the field coils 14 and 15 with the other ends of the coils are connected together. The field coils 14 and 15 are wound on the rotor so that a current flowing through them and the diode will produce a unidirectional magnetic field on the rotor.

An output coil generally designated as 18 is wound on the stator of the alternator 10 in a conventional manner to provide the desired output voltage. For example, the voltage across lines 20 and 21 and also across lines 21 and 22 of the output coil nominally is 110 volts of 60 Hz alternating current. In this example the voltage across the outer lines 20 and 22 is 220 volts.

Also wound on the stator of the alternator 10 is an excitation coil assembly comprising a main excitation coil 24 and an auxiliary excitation coil 26 in close proximity to each other. The two excitation coils 24 and 26 are wound on stator so that the voltage across them has a 90 degree phase difference with respect to the output coil voltage. The main excitation coil 24 has two terminals E1 and E2 and the auxiliary excitation coil 26 has three taps coupled to terminals, A1, A2 and A3. Alternatively, the present invention could be practiced using a single excitation coil with multiple taps to allow for voltage adjustment. Typically, the auxiliary excitation coil 26 has a fewer number of ampere-turns as compared to the main excitation coil 24. The number of turns between various tap terminals is a matter of design choice to carry out the desired degree of voltage adjustment.

An external excitation capacitor 28 has a first terminal C1 coupled to terminal E1 on the main excitation coil 24. The other terminal C2 of capacitor 28 is shown unconnected in FIG. 1. However, capacitor terminal C2 is connected to one of the remaining terminals of either the main or the auxiliary excitation coil 24 or 26 to produce the desired output voltage as will be described hereinafter.

It is recognized that the voltage induced in the field coils 14 and 15 is a function of the vector summation of the number of ampere-turns in the excitation and output coils. Furtheremore, the output voltage of the alternator 10 is a function of the field current from the rectification of the induced field coil voltage. Therefore, the number of turns connected to the capacitor 28 affects the output voltage. The number of turns in each portion of the auxiliary excitation coil 26 is determined to provide a desired variation in the output voltage. For example, the auxiliary excitation coil winding between terminals A1 and A2 provides a two volt change in the output voltage. Similarly the number of turns between terminals A2 and A3 will produce a variation in the magnetic flux that corresponds to a four volt change in the output voltage from the alternator 10. As a further variation, the two portions of the auxiliary coil 26 may be combined by using terminals A1 and A3 to achieve a six volt variation in the output voltage from the alternator 10. Whether the output voltage is increased or decreased is determined by how the auxiliary coil 26 is connected to terminals E2 and C2. This determines whether the current through the auxiliary coil produces a magnetic flux in the same or opposite direction to the flux in the main excitation coil 24. The alternator 10 may be manufactured with an auxiliary excitation coil 26 which provides other increments or a greater range of voltage adjustment.

The principles of operation for alternator 10 are the same as the prior art capacitor excited alternator described above. When the alternator is initially operated after manufacture, the second terminal C2 of capacitor 28 is connected directly to terminal E2 of the main excitation coil 24 and the output voltages are measured. If the measured voltages are within the nominal tolerance for the device, no alteration of the excitation coil connections is necessary. However, if the output voltage is outside of the tolerance range, the connection of the second terminal C2 of the excitation capacitor 28 is changed to alter the number of ampere-turns of the excitation coil assembly.

The table of FIG. 2 shows exemplary voltage adjustments for different capacitor connections. For example, assume that the output voltage from the alternator upon initial testing is found to be 114 volts as measured across leads 20 and 21. The overvoltage is compensated for by connecting the second terminal C2 of capacitor 28 to terminal A3 of the auxiliary excitation coil 26. A jumper wire is also placed between terminal A2 on the auxiliary excitation coil 26, and the second terminal E2 on the main excitation coil 24. As a result of the direction of the two excitation coil windings, the auxiliary coil 26 produces a magnetic flux flowing in the opposite direction to the flux produced by the main excitation coil current, thereby reducing the magnitude of the net flux produced by the excitation coil assembly. This reduced net magnetic flux in the alternator 10 causes a four volt reduction in the output voltage across leads 20 and 21 from when only the main excitation coil 24 was connected.

Similarly, if the output voltage was too low, for example 108 volts, the auxiliary excitation coil 26 is connected to increase the net magnetic flux thereby producing a higher output voltage. In this case according to the table of FIG. 2, the second terminal C2 of the excitation capacitor 28 would be connected to terminal A1 of the auxiliary coil 26 and terminal A2 would be connected to terminal E2 of main excitation coil 24.

By incorporating an auxiliary excitation coil 26 along with the main excitation coil 24, the number of turns of the winding which is used to excite the rotor field may be varied to adjust the magnetic flux developed in the alternator 10. This permits easy adjustment of the output voltage to within an acceptable tolerance of the nominal value. Unlike conventionally excited brushless generators which use potentiometers to vary the current flowing through a single excitation coil, the present invention provides a mechanism for changing the number of turns of the excitation coil to vary the magnetic flux without losing any power developed in the excitation circuit.

I claim:

1. A brushless electrical generator comprising:
   a rotor assembly having a rotor coil and a diode connected in series with the rotor coil;
   a stator coil for producing the output current of the generator, said stator coil having a voltage induced thereacross;
   an excitation coil means for inducing a current in said rotor coil, said excitation coil means having more than two terminals;
   an excitation capacitor; and
   means for selectively connecting said excitation capacitor across two of the more than two terminals of said excitation coil means to adjust the voltage induced across said stator coil.

2. The generator as recited in claim 1 wherein said excitation coil means comprises a main excitation coil having a terminal at each end; and an auxiliary excitation coil having a plurality of terminals.

3. The generator as recited in claim 2 further comprising means for connecting the main excitation coil to the auxiliary excitation coil.

4. A synchronous generator comprising:
   a stator including an output coil, and an excitation coil means having more than two terminals;
   means for connecting said excitation capacitor between a selectable pair of terminals of the excitation coil means, the pair of terminals being chosen to produce the desired voltage across the output coil during operation of the generator; and
   a brushless rotor including a field coil means and a rectifier means connected across the field coil means.

5. The generator as claimed in claim 4 wherein said excitation coil means comprises a main excitation coil and a separate auxiliary excitation coil.

6. The generator as recited in claim 2 wherein said main excitation coil and said auxiliary excitation coil are both wound so that a voltage across them has a ninety degree phase difference with respect to the voltage across said stator coil.

7. A brushless electrical generator comprising:
   a rotor assembly having a rotor coil and a diode connected in series with the rotor coil;
   a stator coil for producing the output current of the generator, said stator coil having a voltage induced thereacross;
   an excitation coil for inducing a current in said rotor coil, said excitation coil means having more than two taps;
   an excitation capacitor; and
   means for selectively connecting said excitation capacitor across two of the more than two taps of said excitation coil to adjust the voltage induced across said stator coil to a desired nominal voltage.

* * * * *

UNITED STATES PATENT AND TRADEMARK OFFICE
CERTIFICATE OF CORRECTION

PATENT NO. : 4,786,853
DATED : Nov. 22, 1988
INVENTOR(S) : Richard D. VanMaaren

It is certified that error appears in the above-identified patent and that said Letters Patent is hereby corrected as shown below:

Column 1, line 48, delete first occurrence of "in the".

Column 2, line 3, change "gnerator" to --generator--.

Column 2, line 16, change "on" to --of--.

Column 2, line 17, change "in" to --is--.

Column 2, line 31, delete "are".

Column 2, line 50 change "Alter-" to --Alter---.

Column 3, line 2, change "Furtheremore" to --Furthermore--.

Column 4, between lines 36 and 37, insert the paragraph --an excitation capacitor;--.

Column 4, line 45, change "claimed" to --recited--.

Signed and Sealed this

Second Day of May, 1989

Attest:

DONALD J. QUIGG

Attesting Officer

Commissioner of Patents and Trademarks